(12) United States Patent
Agiwal et al.

(10) Patent No.: US 10,034,199 B2
(45) Date of Patent: Jul. 24, 2018

(54) METHOD AND SYSTEM FOR PARALLELIZING PACKET PROCESSING IN WIRELESS COMMUNICATION

(71) Applicant: Samsung Electronics Co., Ltd., Suwon-si, Gyeonggi-do (KR)

(72) Inventors: Anil Agiwal, Bangalore (IN); Anshuman Nigam, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 14/771,961

(22) PCT Filed: Mar. 4, 2014

(86) PCT No.: PCT/KR2014/001768
§ 371 (c)(1),
(2) Date: Sep. 1, 2015

(87) PCT Pub. No.: WO2014/137136
PCT Pub. Date: Sep. 12, 2014

(65) Prior Publication Data
US 2016/0021567 A1    Jan. 21, 2016

(30) Foreign Application Priority Data

Mar. 4, 2013 (IN) .............................. 919/CHE/2013
Mar. 3, 2014 (IN) .............................. 919/CHE/2013

(51) Int. Cl.
*H04W 28/06* (2009.01)
*H04W 76/15* (2018.01)
(Continued)

(52) U.S. Cl.
CPC .......... *H04W 28/06* (2013.01); *H04B 7/2612* (2013.01); *H04L 69/24* (2013.01); *H04W 76/15* (2018.02); *H04L 1/18* (2013.01)

(58) Field of Classification Search
None
See application file for complete search history.

(56) References Cited

U.S. PATENT DOCUMENTS

2006/0031513 A1* 2/2006 Ido ................... H04L 29/06027
709/227
2006/0245417 A1* 11/2006 Conner ................ H04L 1/0041
370/352

(Continued)

FOREIGN PATENT DOCUMENTS

| CN | 101091359 A | 12/2007 |
|---|---|---|
| CN | 102882641 A | 1/2013 |
| KR | 10-2008-0015693 A | 2/2008 |

OTHER PUBLICATIONS

Hyung G. Myung, Technical Overview of 3GPP LTE, May 18, 2008.

*Primary Examiner* — Hassan Phillips
*Assistant Examiner* — Gautam Sharma
(74) *Attorney, Agent, or Firm* — Jefferson IP Law, LLP

(57) ABSTRACT

The various embodiments herein provide a method and system for parallelizing packet processing in wireless communication. The method comprises of creating, between an UE and a base station a plurality of radio bearers for carrying data packets of an Evolved Packet System (EPS) bearer, processing the data packets of the EPS bearer associated with the radio bearers by a transmitter using a first set of processing functions, distributing the processed data packets of the EPS bearer to the associated radio bearers, processing the data packets distributed of the EPS bearer in parallel by independently using a second set of processing functions, transmitting the processed data packets of each radio bearer to a receiver, receiving the data packets over a physical (Continued)

channel by the receiver and processing the received data packets of the EPS bearer associated with the radio bearers by the receiver.

23 Claims, 14 Drawing Sheets

(51) Int. Cl.
  *H04B 7/26* (2006.01)
  *H04L 29/06* (2006.01)
  *H04L 1/18* (2006.01)

(56) References Cited

U.S. PATENT DOCUMENTS

| | | | |
|---|---|---|---|
| 2007/0168827 A1 | 7/2007 | Lohr et al. | |
| 2007/0189235 A1 | 8/2007 | Chandra et al. | |
| 2008/0020775 A1 | 1/2008 | Willars | |
| 2008/0130557 A1 | 6/2008 | Kuchibhotla et al. | |
| 2010/0220640 A1* | 9/2010 | Slack | H04W 28/18 370/311 |
| 2010/0260126 A1* | 10/2010 | Ulupinar | H04B 7/2606 370/329 |
| 2010/0329135 A1 | 12/2010 | Pelletier et al. | |
| 2011/0235569 A1* | 9/2011 | Huang | H04W 28/02 370/315 |
| 2012/0014337 A1 | 1/2012 | Speight | |
| 2012/0120831 A1* | 5/2012 | Gonsa | H04W 76/025 370/252 |
| 2014/0226571 A1* | 8/2014 | Das | H04L 41/0896 370/329 |
| 2015/0230225 A1* | 8/2015 | Uchino | H04W 72/0406 455/450 |

* cited by examiner

[Fig. 1]
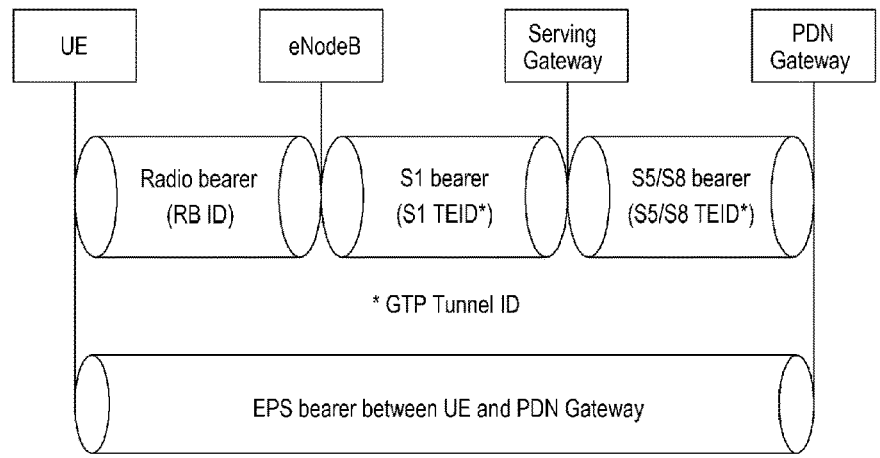
[Fig. 2]
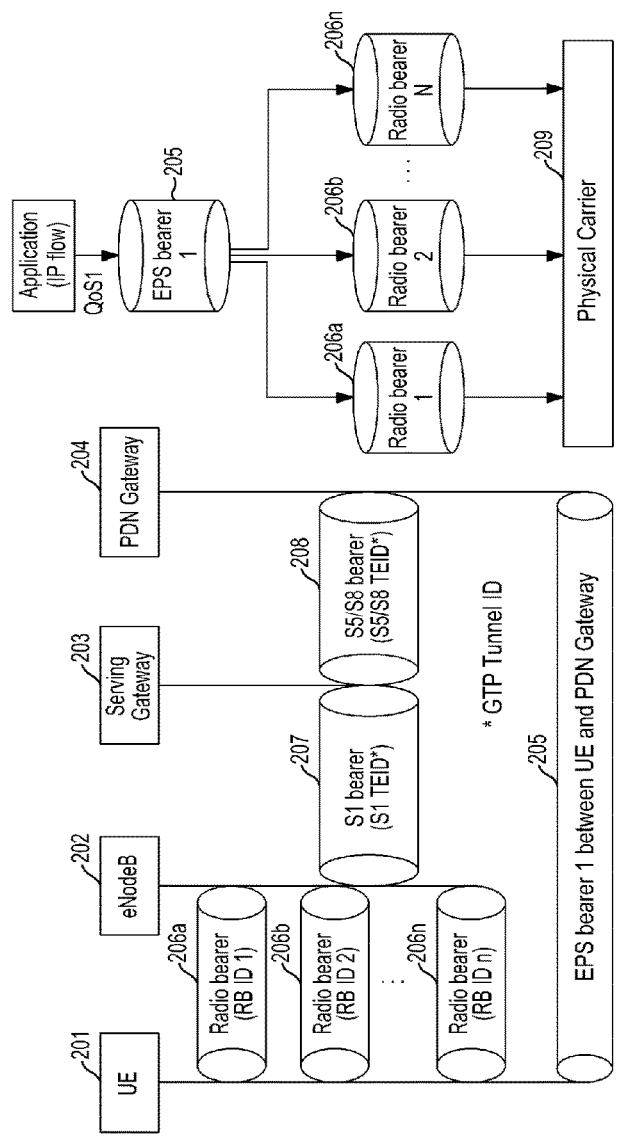

[Fig. 3a]
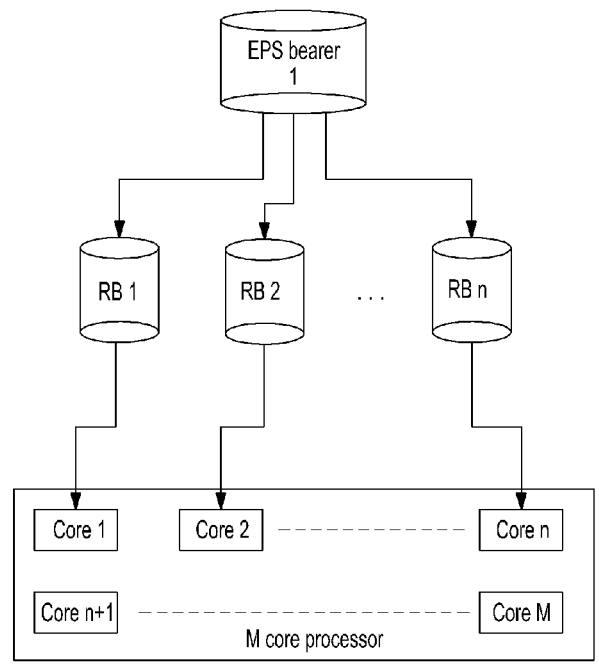
[Fig. 3b]
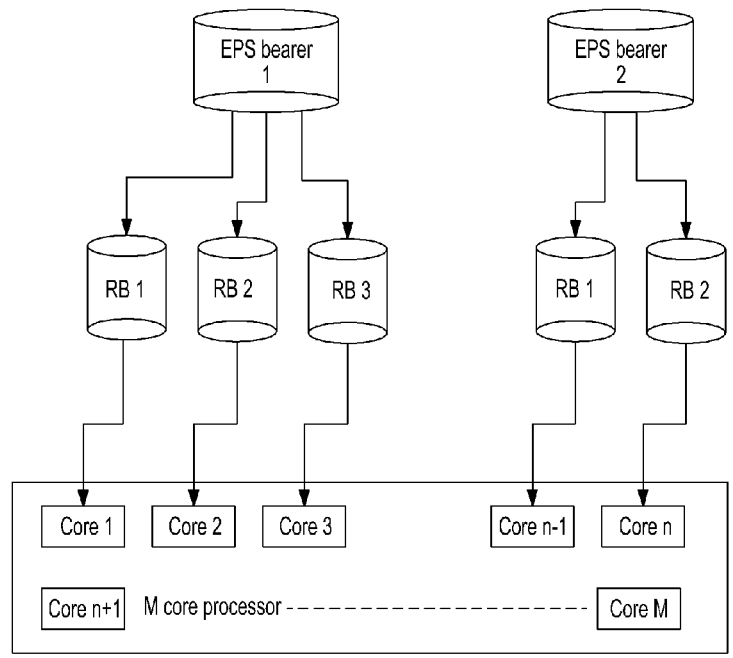

[Fig. 4a]
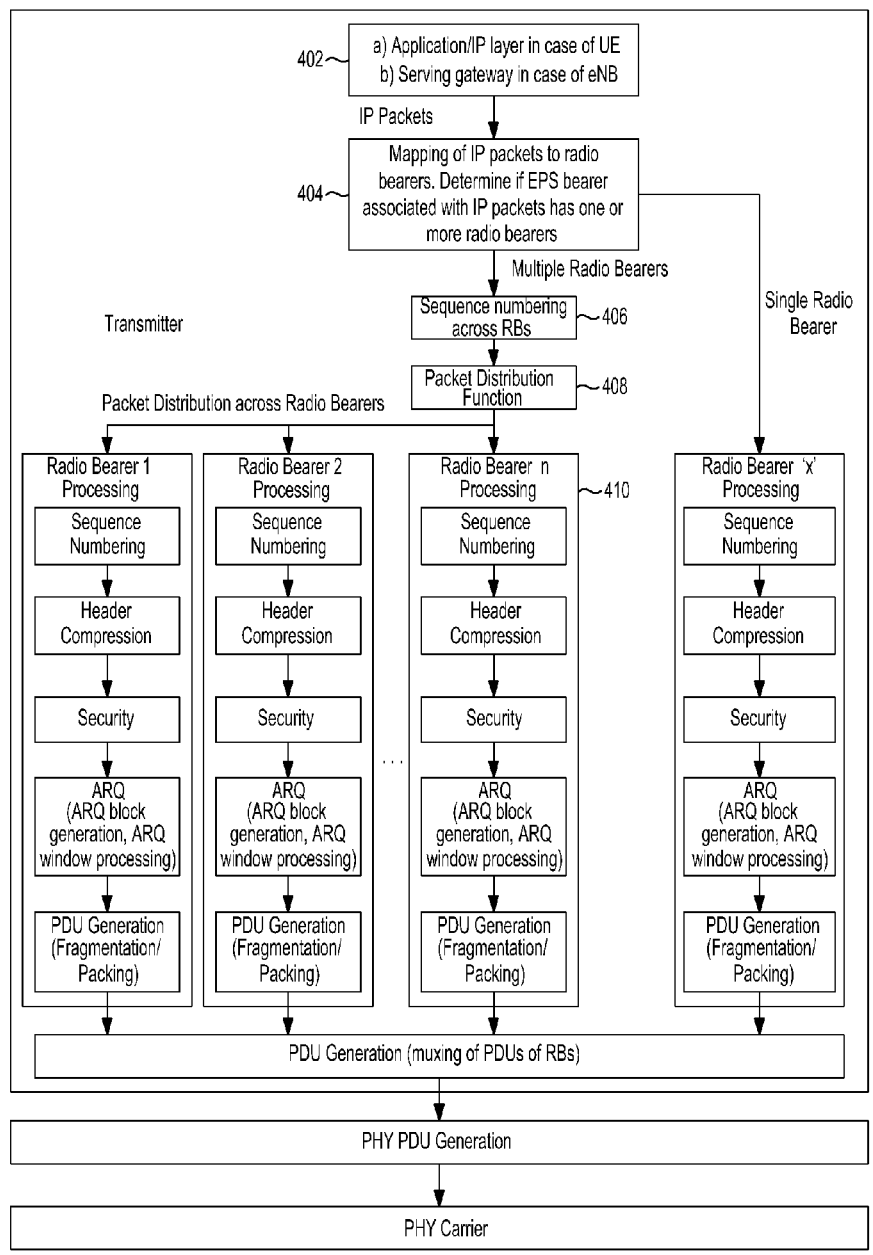

[Fig. 4b]
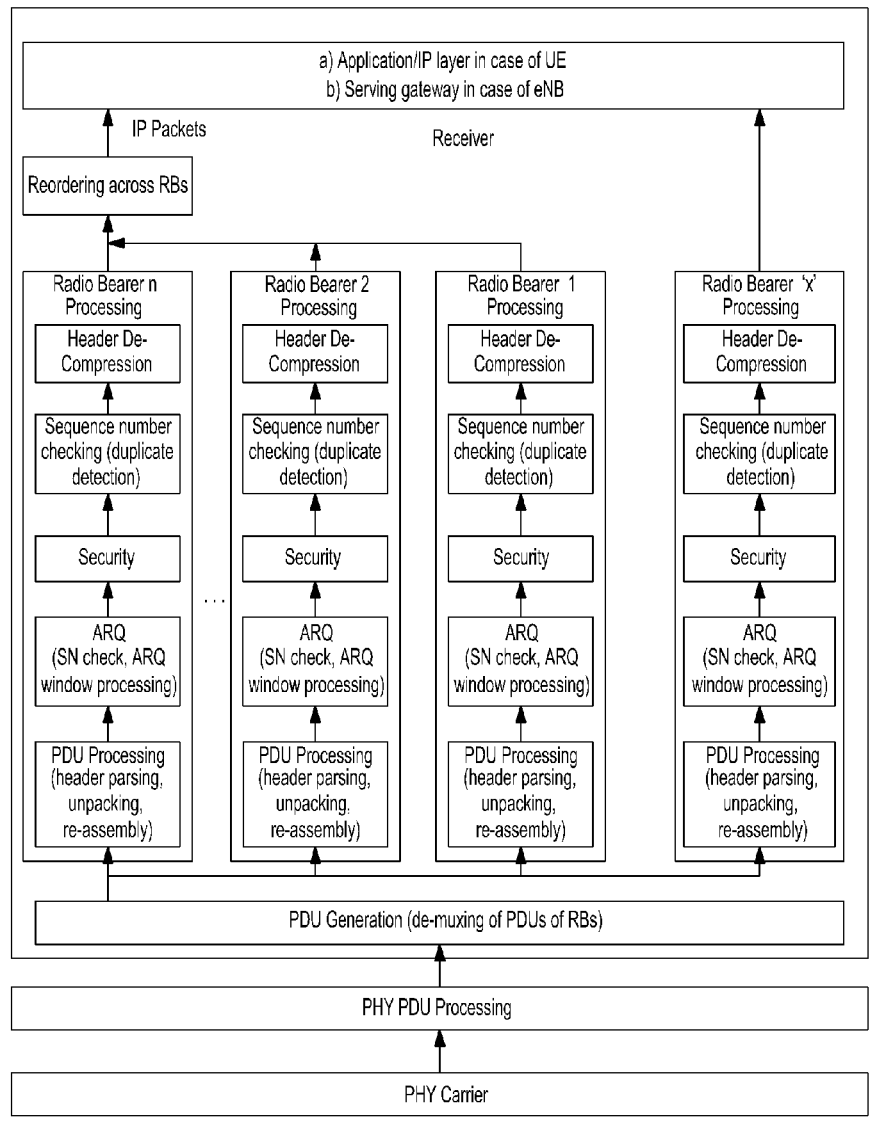

[Fig. 4c]
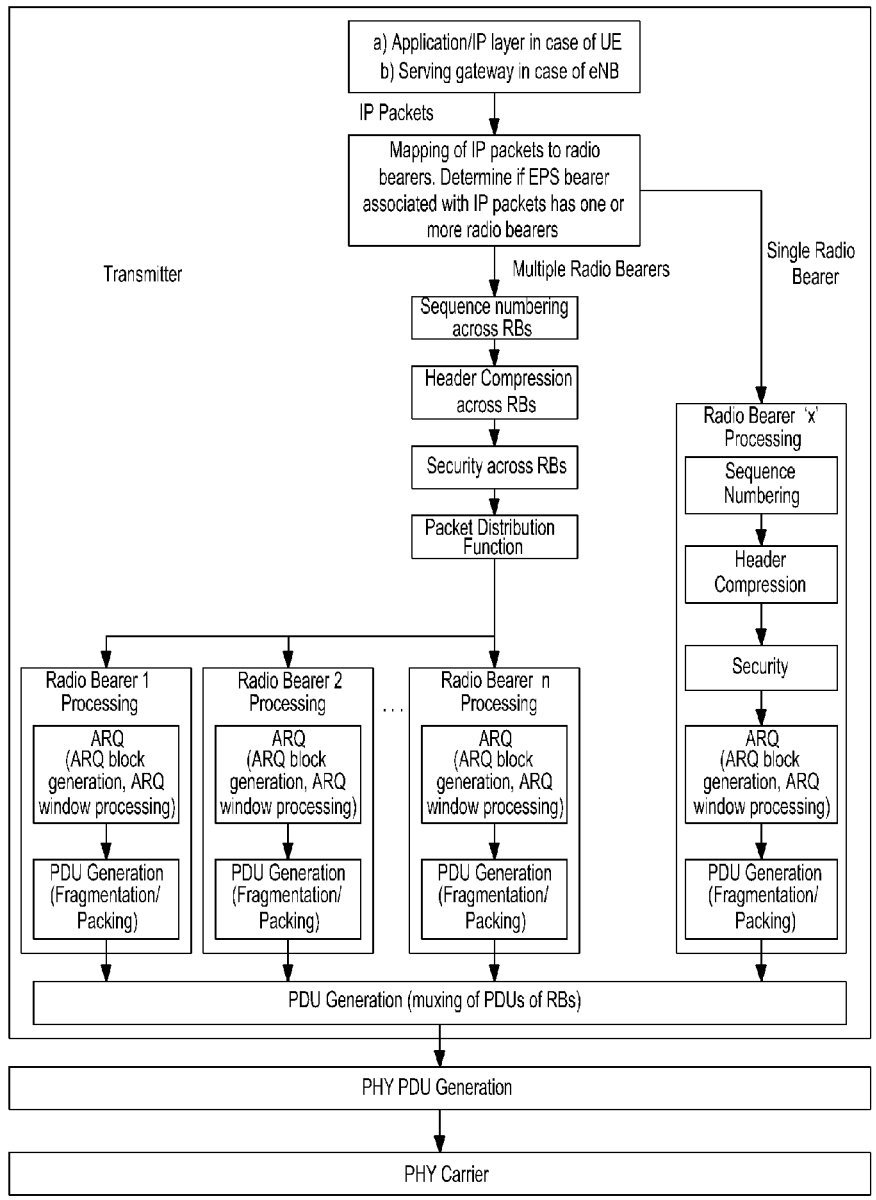

[Fig. 4d]
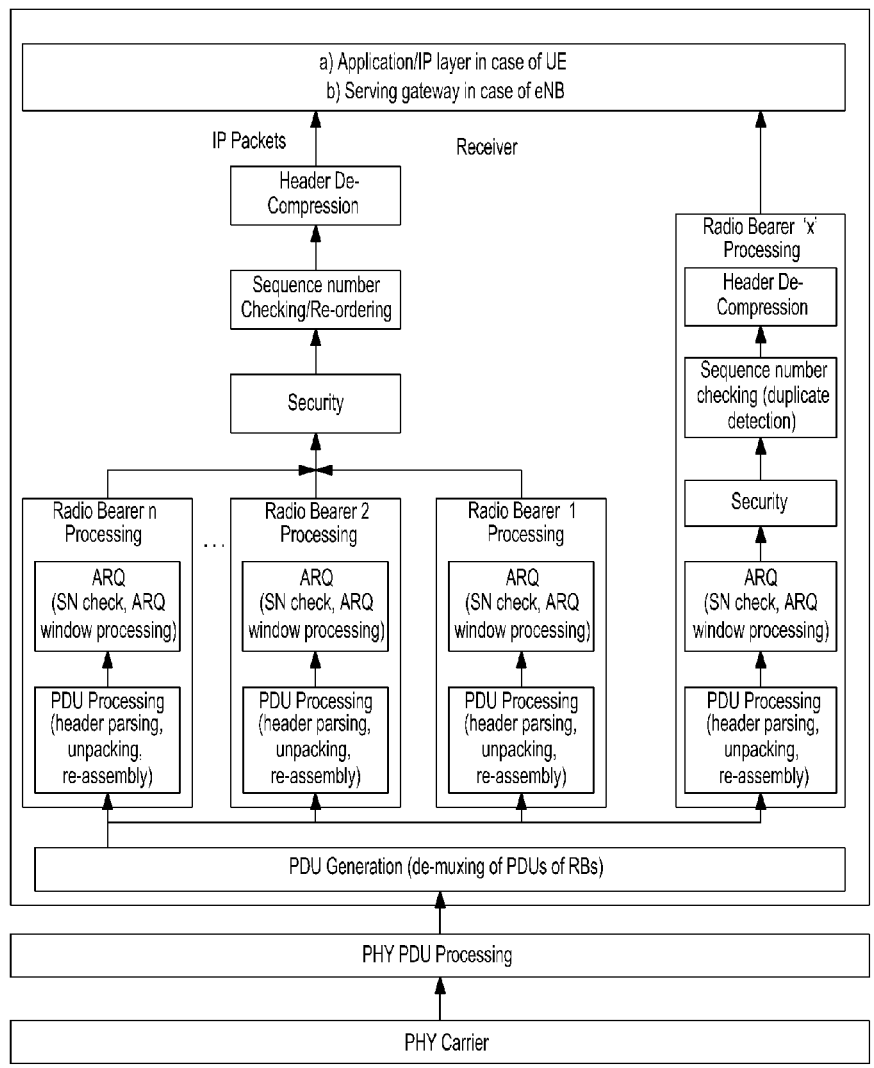

[Fig. 4e]
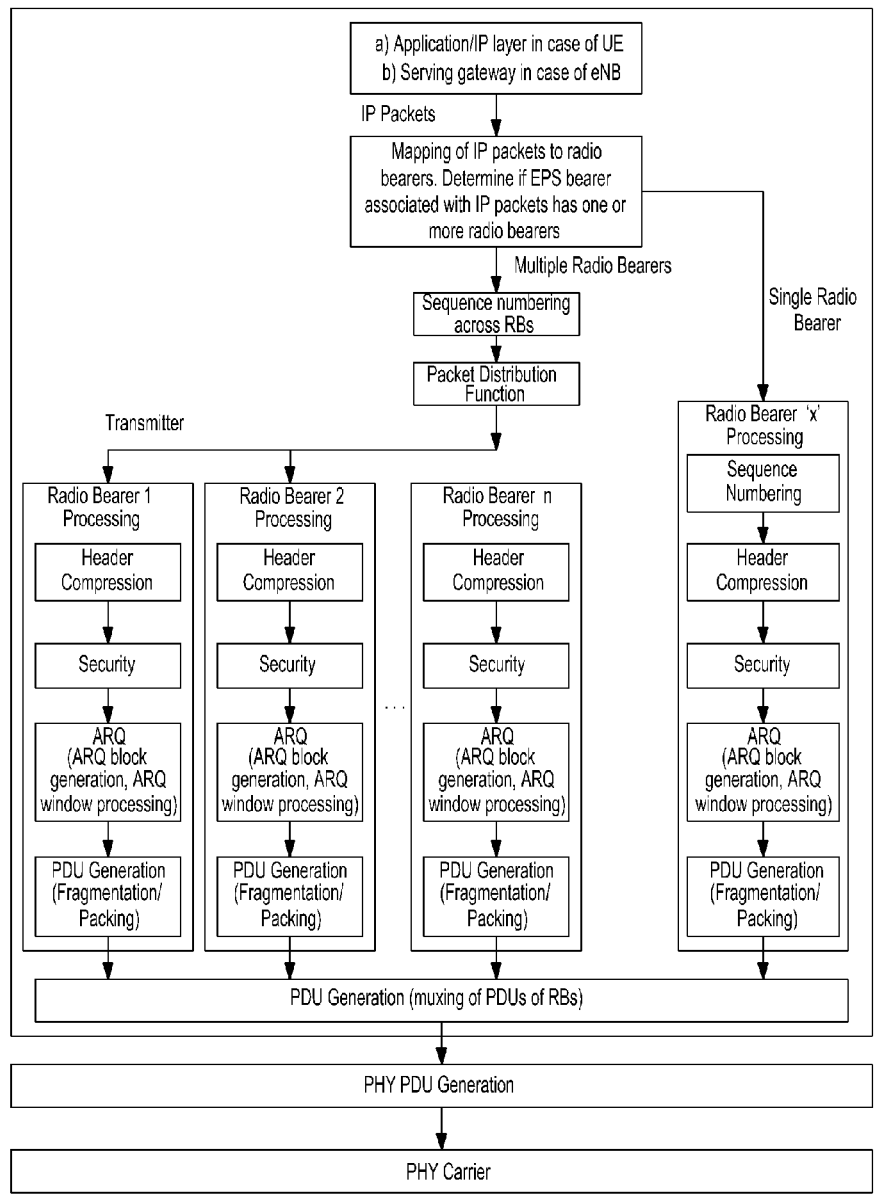

[Fig. 4f]
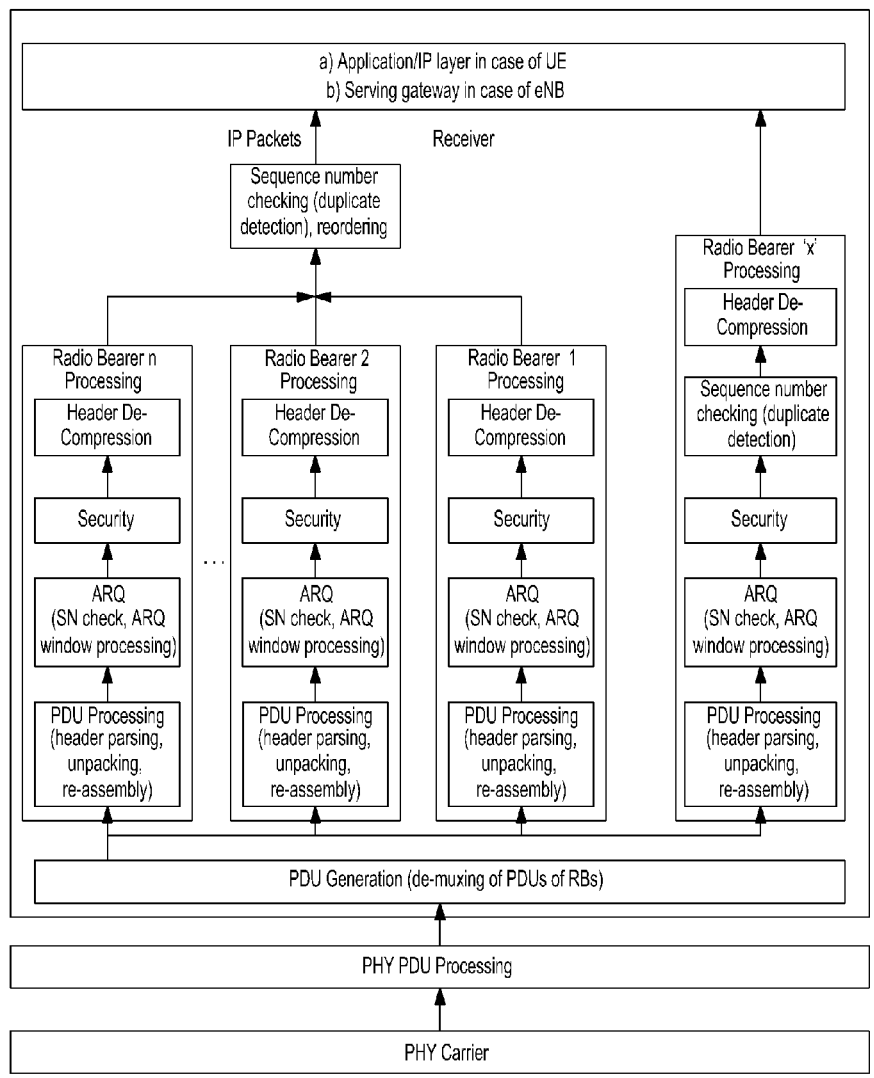

[Fig. 4g]
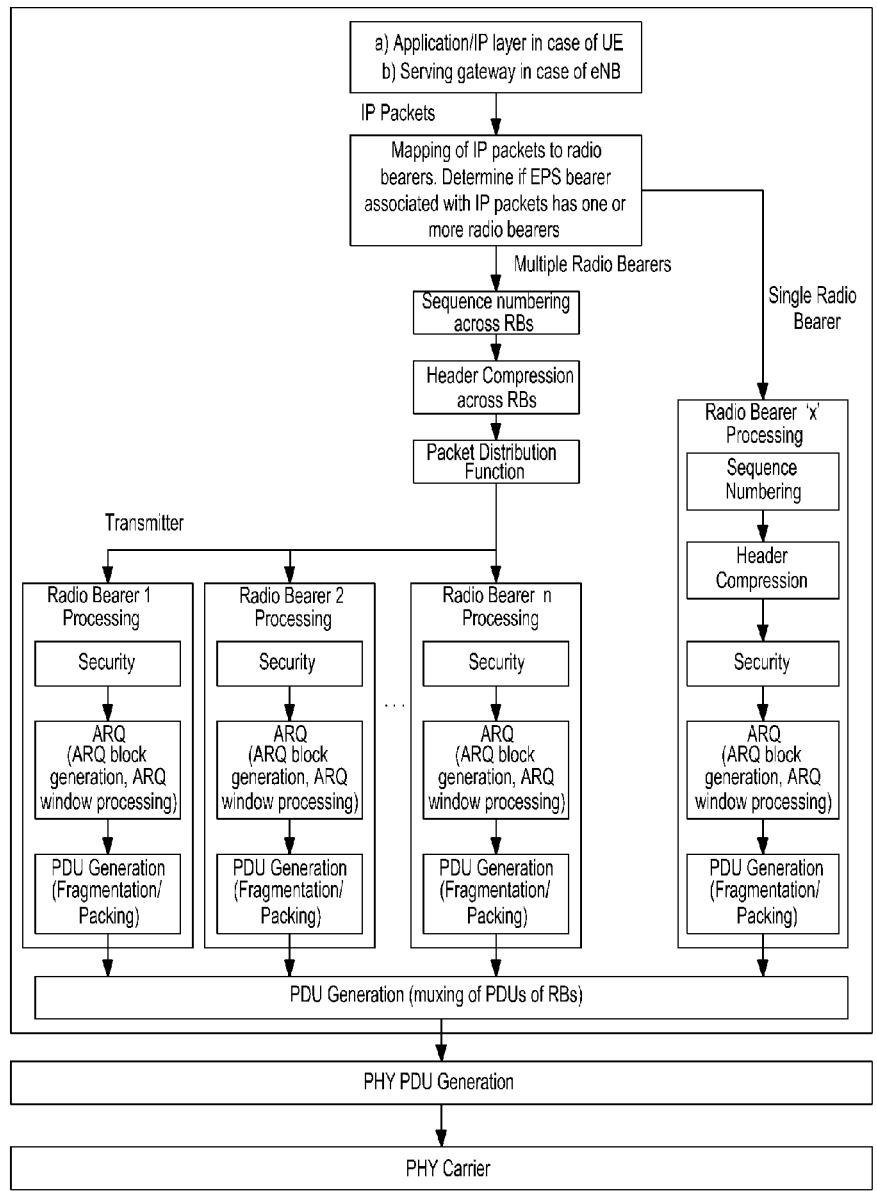

[Fig. 4h]
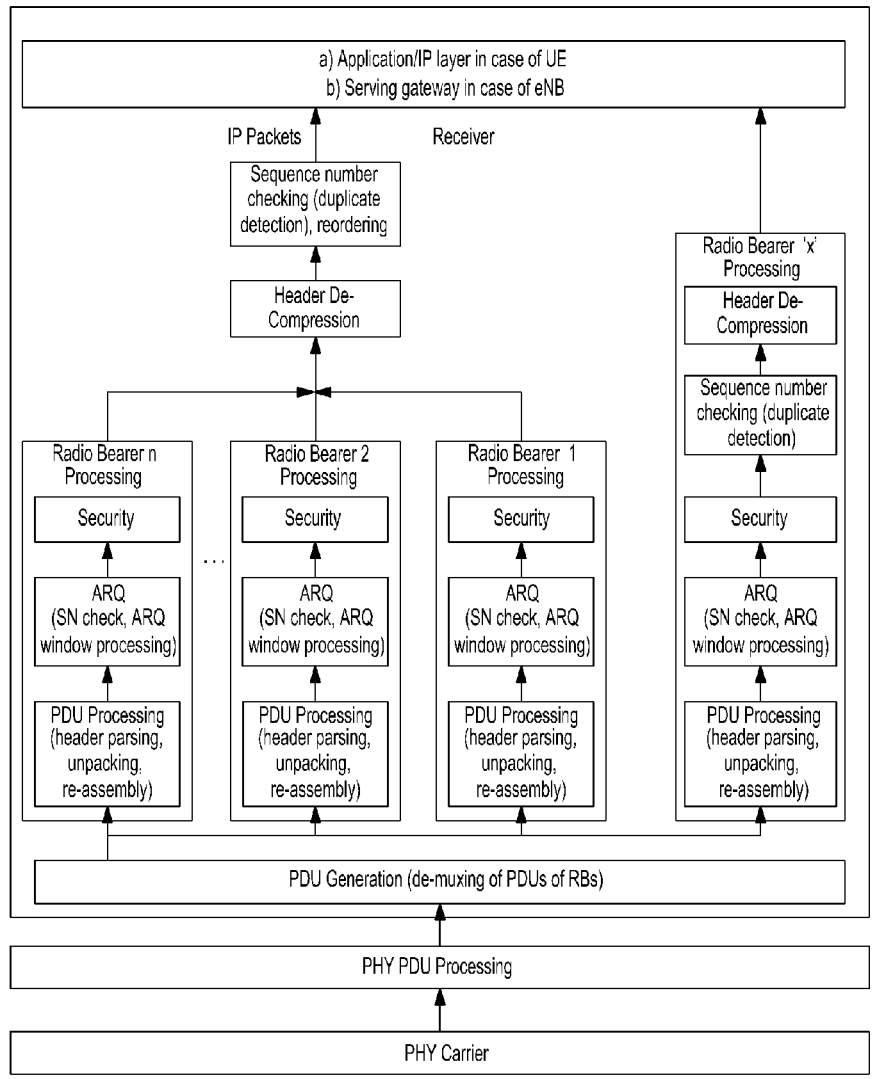
[Fig. 5]
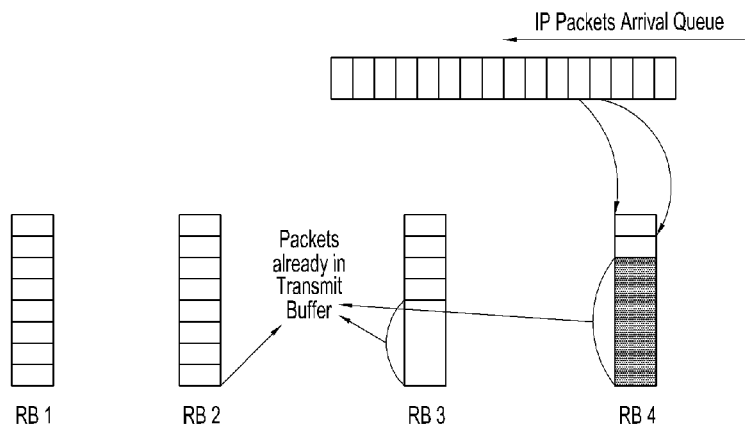

[Fig. 6]
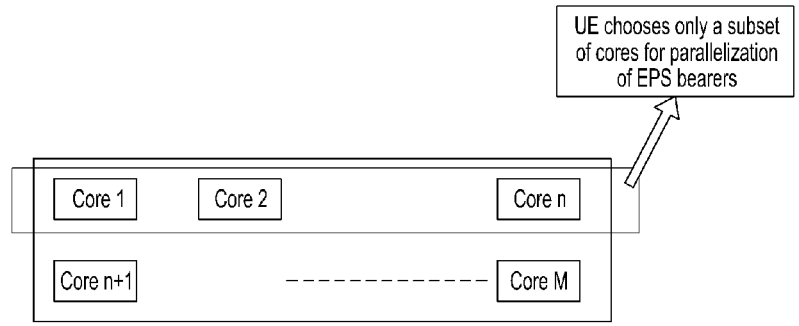
[Fig. 7]
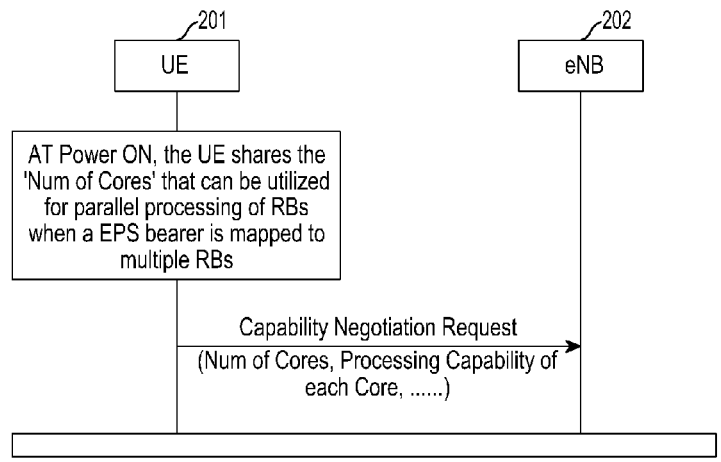
[Fig. 8]
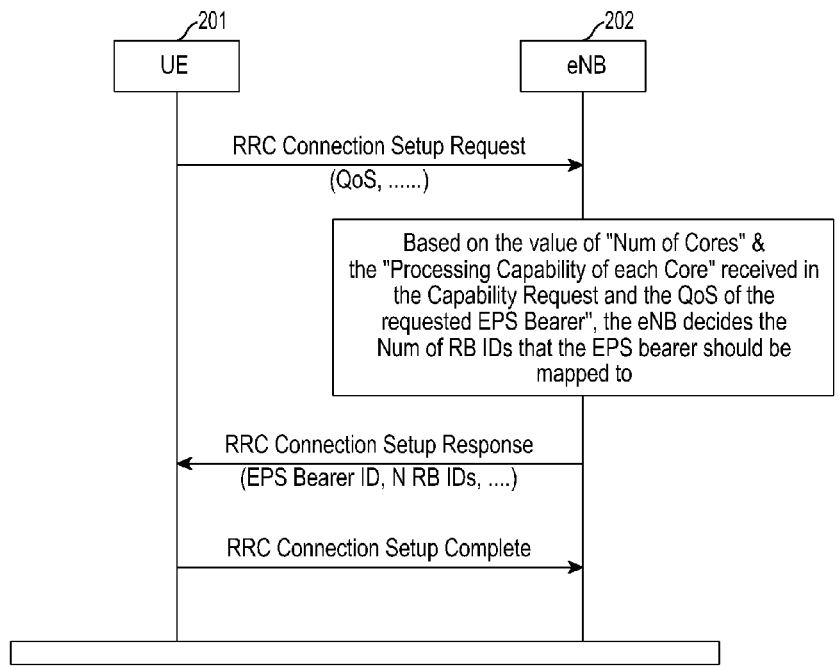

[Fig. 9]
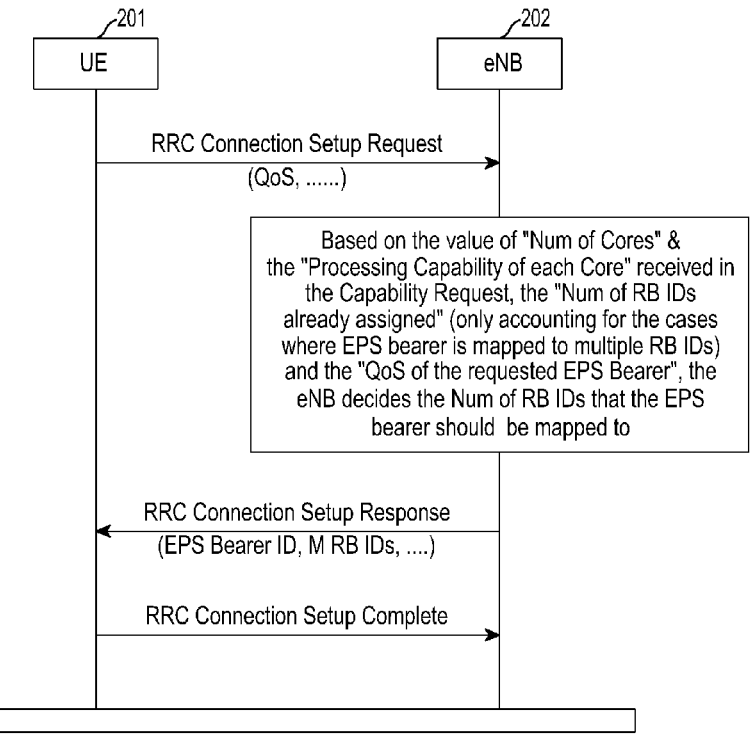
[Fig. 10]
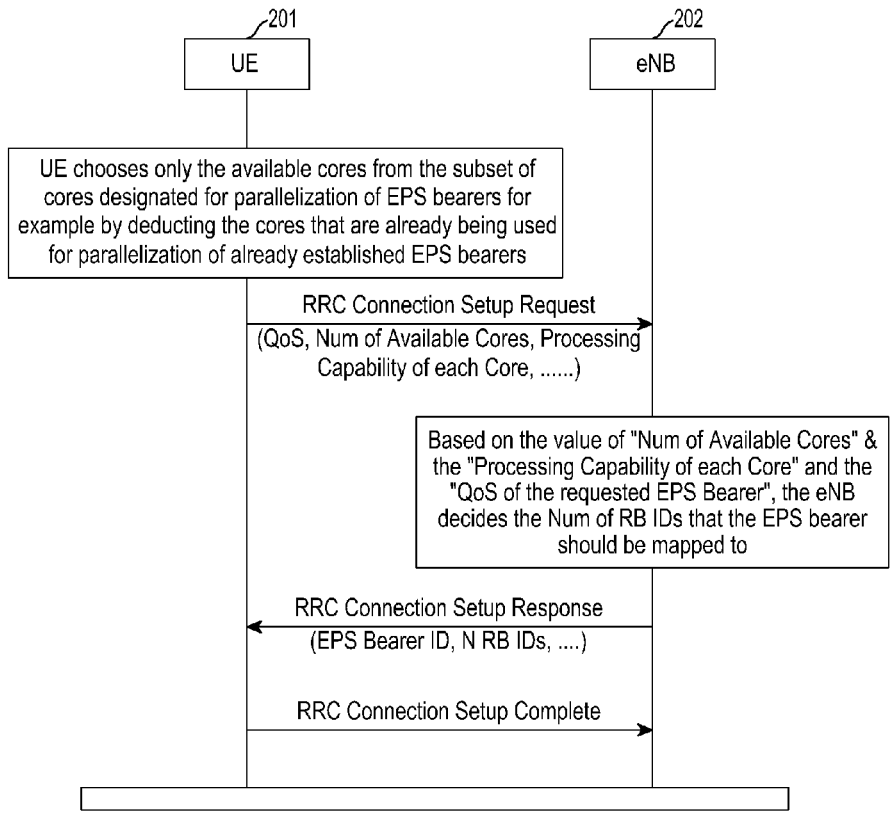

[Fig. 11]
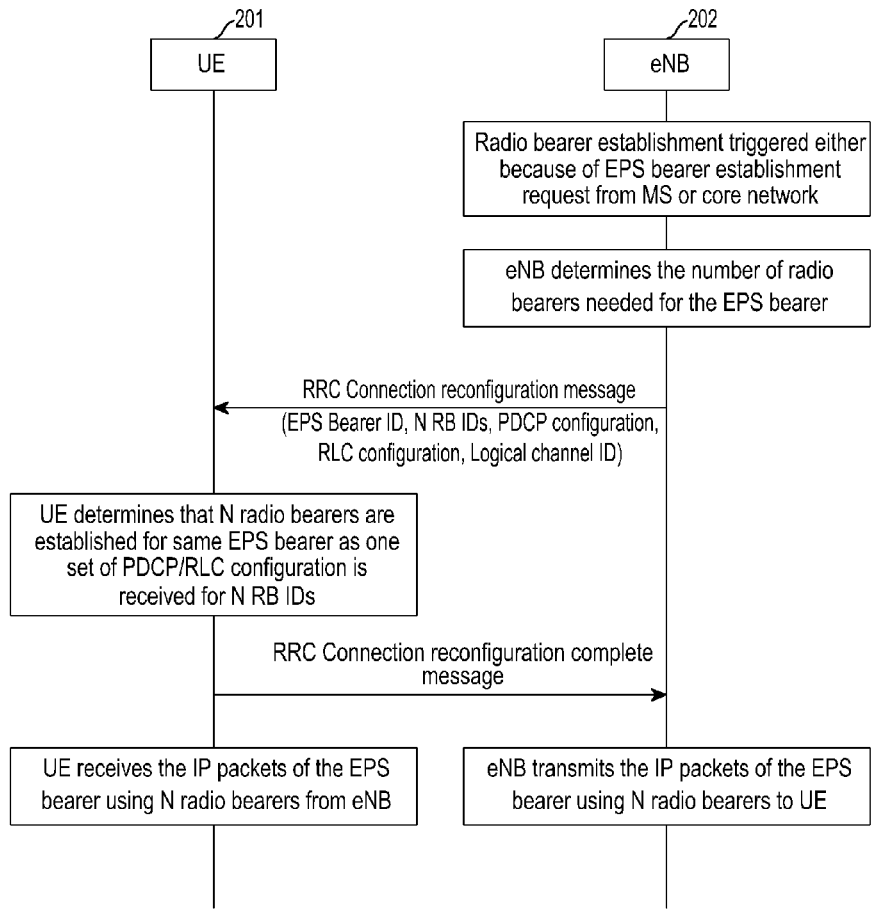
[Fig. 12]

[Fig. 13]
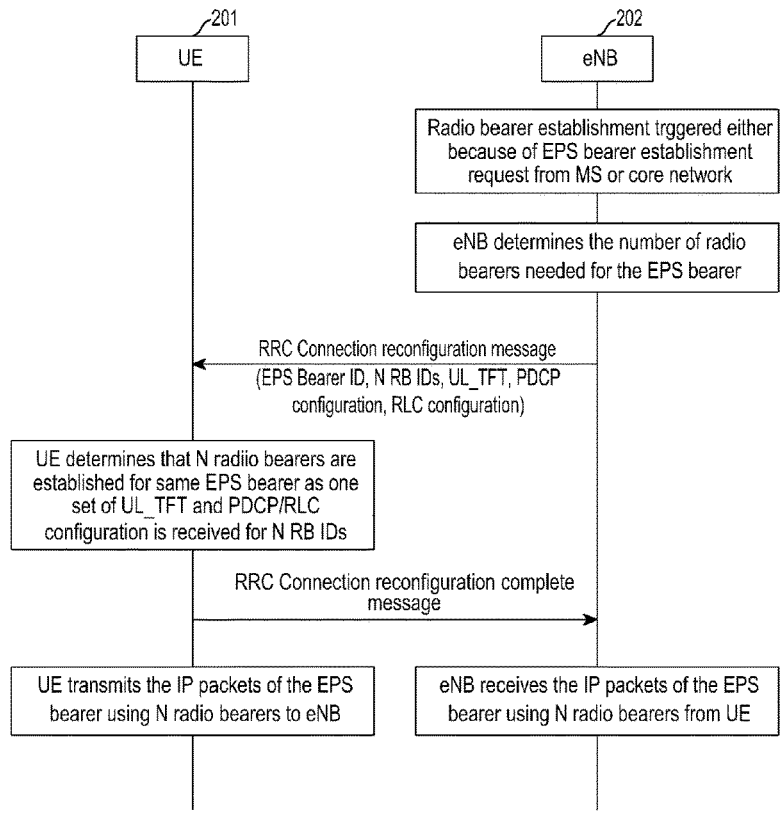
[Fig. 14]
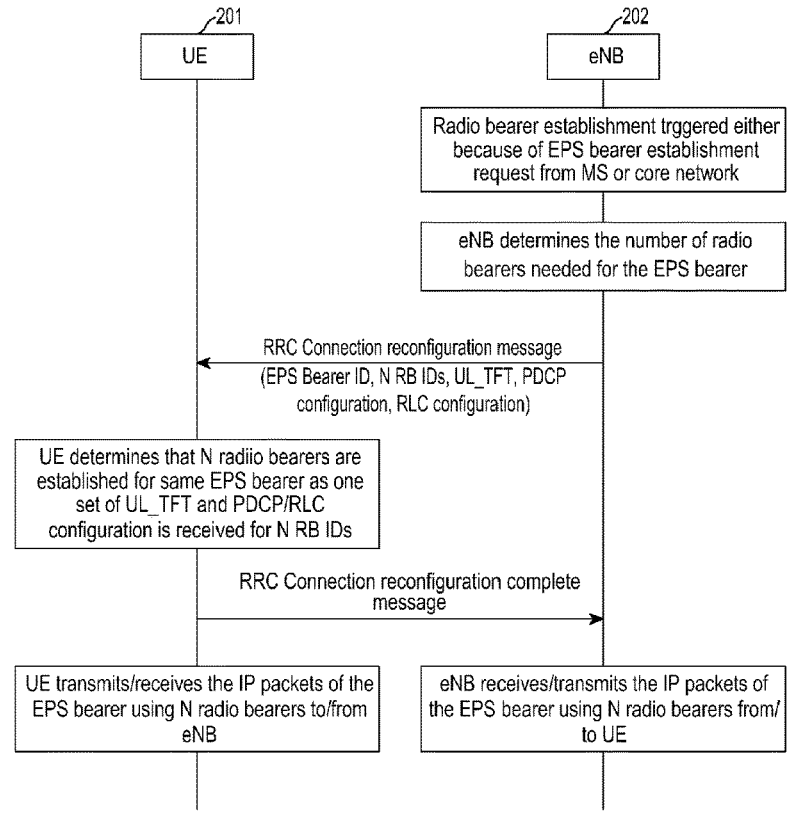

METHOD AND SYSTEM FOR PARALLELIZING PACKET PROCESSING IN WIRELESS COMMUNICATION

PRIORITY

This application is a U.S. National Stage application under 35 U.S.C. § 371 of an International application filed on Mar. 4, 2014 and assigned application number PCT/KR2014/001768, which claimed the benefit of an Indian patent application filed on Mar. 4, 2013 in the Indian Patent Office and assigned Serial number 919/CHE/2013, and of an Indian patent application filed on Mar. 3, 2014 in the Indian Patent Office and assigned Serial number 919/CHE/2013, the entire disclosure of each of which is hereby incorporated by reference.

TECHNICAL FIELD

The embodiments of the present invention generally relate to the field of wireless communication and particularly relate to a method of processing data packets in wireless communication systems. The embodiments herein more particularly relates to a method and system for parallelizing processing of data packets in transmitter and receiver in wireless mobile communication.

BACKGROUND ART

In the recent years several broadband wireless technologies have been developed to meet the growing number of broadband subscribers and to provide more and better applications and services. The 3rd Generation Partnership Project 2 (3GPP2) developed Code Division Multiple Access 2000 (CDMA 2000), 1× Evolution Data Optimized (1×EVDO) and Ultra Mobile Broadband (UMB) systems. The 3rd Generation Partnership Project (3GPP) developed Wideband Code Division Multiple Access (WCDMA), High Speed Packet Access (HSPA) and Long Term Evolution (LTE) systems. As more and more people become users of mobile communication systems and more and more services are provided over these systems, there is an increasing need for an advanced wireless communication system with large capacity, high throughput and lower latency.

One of the key goals for the advanced wireless communication systems is to support peak data rate of the order of 50 giga bits per second (Gbps) and an average user throughput of the order of 1 Gbps. The implementation of latest wireless communication technologies like LTE, Advanced WiMAX in the mobile handsets currently supports protocol stack medium access (MAC) layer throughput up to 100 megabits per second (Mbps). However, supporting very high data rate of the order of Gbps continue to be a challenge in the mobile handsets.

Various functions are involved in the packet processing at the transmitter and receiver in wireless communication. Several techniques exists in the prior art to reduce the packet processing time by reducing and simplifying the number of packet processing functions. Several techniques also exists in the prior art to reduce the packet processing time by parallelization. For example, a) Encryption at Packet Data Convergence Protocol (PDCP) layer instead of encryption at MAC layer: Facilitates parallel processing of security and other packet processing functions during uplink transmission by UE.

b) Multi flow (multiple radio bearers/(Evolved Packet System (EPS) bearers) architecture: Facilitates parallel processing of packets of various EPS bearers or IP flows.

The foregoing examples of the related art and limitations related therewith are intended to be illustrative and not exclusive. Other limitations of the related art will become apparent upon a reading of the specification and a study of the drawings.

DISCLOSURE OF INVENTION

Technical Problem

In the advanced wireless communication technology the data throughput of a single EPS bearer or IP flow (source address, destination address and port number) will also be in order of Gbps (for example 3D video streaming, ultra high definition video streaming). The current methods provide only limited parallelization of processing of packets of an EPS bearer or IP flow. Parallelizing entire packet processing is not possible because of interdependency between the packets. For instance, Automatic Repeat Request (ARQ) window update of one packet cannot happen in parallel to ARQ window update of another packet.

In view of the foregoing, there is a need to provide a method and system for parallelizing packet processing which facilitates faster processing of large number of data packets in a lesser time.

Solution to Problem

The various embodiments herein provide a method for parallelizing packet processing in wireless communication. The method comprising steps of creating, between an User Equipment (UE) and a base station (BS) a plurality of radio bearers, wherein the plurality of radio bearers carry data packets of an Evolved Packet System (EPS) bearer, processing the data packets of the EPS bearer associated with the plurality of radio bearers by a transmitter, wherein a first set of processing functions are applied to the data packets of the EPS bearer, distributing the processed data packets of the EPS bearer to the associated plurality of radio bearers, processing the distributed data packets of the EPS bearer in parallel, wherein a second set of processing functions are applied to the data packets of each radio bearer of the EPS bearer independently, transmitting the processed data packets of each radio bearer of the EPS bearer to the receiver over the physical channel between the UE and the BS, receiving the data packets over the physical channel by the receiver and processing the received data packets of the EPS bearer associated with the plurality of radio bearers by a receiver.

According to an embodiment of the present invention, the method of processing the data packets of the EPS bearer associated with the plurality of radio bearers by the transmitter using the first set of processing functions comprises of sequence numbering the data packets of the EPS bearer wherein the sequence numbering is performed if the data packet needs to be reordered in the receiver.

According to an embodiment of the present invention, processing the data packets of the EPS bearer associated with plurality of radio bearers by the transmitter using the first set of processing functions further comprises of sequence numbering the data packets of the EPS bearer wherein the sequence numbering is applied if the data packet needs to be reordered in the receiver, compressing a header of the data packets of the EPS bearer and applying security to the data packets of the EPS bearer.

According to an embodiment of the present invention, processing the data packets of the EPS bearer associated with plurality of radio bearers by the transmitter using the first set of processing functions further comprises of sequence numbering the data packets of the EPS bearer wherein the sequence numbering is applied if the data packet needs to be reordered in the receiver and compressing the header of the data packets of the EPS bearer According to an embodiment of the present invention, processing the distributed data packets to the radio bearer of the EPS bearer in parallel using a second set of processing functions comprises of applying sequence numbering, header compression, security, ARQ and PDU generation functions to the data packets of the radio bearer of the EPS bearer associated with the plurality of radio bearers.

According to an embodiment of the present invention, processing the distributed data packets to the radio bearer of the EPS bearer in parallel using a second set of processing functions comprises of applying ARQ and PDU generation functions to the data packets of each radio bearer of the EPS bearer associated with the plurality of radio bearers.

According to an embodiment of the present invention, processing the distributed data packets to the radio bearer of the EPS bearer in parallel using the second set of processing functions comprises of applying a header compression, security, ARQ and PDU generation functions to the data packets of each radio bearer of the EPS bearer associated with the plurality of radio bearers.

According to an embodiment of the present invention, wherein processing the distributed data packets to the radio bearer of the EPS bearer in parallel using the second set of processing functions comprises of applying security, ARQ and PDU generation functions to the data packets of each radio bearer of the EPS bearer associated with the plurality of radio bearers.

According to an embodiment of the present invention, the plurality of radio bearers associated with the EPS bearer is configured to apply same processing functions to the data packets.

According to an embodiment of the present invention, the plurality of radio bearers associated with the EPS bearer is configured with same protocol sub layer parameter and configurations.

According to an embodiment of the present invention, processing of data packets by the plurality of radio bearers is executed on distinct processing cores in parallel.

According to an embodiment of the present invention, distributing the plurality of data packets of the EPS bearer among the associated radio bearers comprises at least one of distributing the plurality of data packets equally among the associated radio bearers, distributing the data packets based on a transmit buffer status associated with each radio bearer and distributing the data packets based on a processing capability of a processing core in which the plurality of radio bearers are processed.

According to an embodiment of the present invention, processing the received data packets of the EPS bearer associated with plurality of radio bearers by the receiver further comprises of processing the data packets of each radio bearer associated with the EPS bearer in parallel, wherein the first set of processing functions are applied to the data packets of each radio bearer of the EPS bearer independently and processing the data packets processed by the plurality of radio bearers associated with the EPS bearer wherein the second set of processing functions is applied to the data packets of the EPS bearer.

According to an embodiment of the present invention, processing the data packets of each radio bearer associated with the EPS bearer in parallel using the first set of processing functions comprises of applying PDU processing, ARQ, security, sequence number checking and header decompression functions to the plurality of data packets.

According to an embodiment of the present invention, processing the data packets of each radio bearer associated with the EPS bearer in parallel using a first set of processing functions comprises of applying PDU processing and ARQ functions to the plurality of data packets According to an embodiment of the present invention, processing the data packets of each radio bearer associated with the EPS bearer in parallel using the first set of processing functions comprises of applying PDU processing, ARQ, security, and header decompression functions to the plurality of data packets.

According to an embodiment of the present invention, processing the data packets of each radio bearer associated with the EPS bearer in parallel using the first set of processing functions comprises of applying PDU processing, ARQ and security functions to the data packets.

According to an embodiment of the present invention, processing the data packets processed by the plurality of radio bearers associated with the EPS bearer using the second set of processing function comprises of applying reordering function to the plurality of data packets of the EPS bearer wherein the reordering functions is applied if the packet needs to reordered in the receiver.

According to an embodiment of the present invention, processing the data packets processed by the plurality of radio bearers associated with the EPS bearer using the second set of processing function comprises of applying security, sequence number checking, header decompression and reordering function to the data packets of the EPS bearer.

According to an embodiment of the present invention, processing the data packets processed by the plurality of radio bearers associated with the EPS bearer using the second set of processing function comprises of applying sequence number checking and reordering function to the data packets of the EPS bearer.

According to an embodiment of the present invention, processing the data packets processed by the plurality of radio bearers associated with the EPS bearer using the second set of processing function comprises of applying sequence number checking, reordering and header decompression function to the data packets of the EPS bearer.

According to an embodiment of the present invention, the EPS bearer is a downlink EPS bearer and the transmitter is the base station.

According to an embodiment of the present invention, the EPS bearer is an uplink EPS bearer and the transmitter is the UE.

According to an embodiment of the present invention, creating an EPS bearer corresponding to a plurality of radio bearers comprises of determining a number of radio bearers required for the EPS bearer by the BS and sending one or more connection configuration messages by the BS to the UE to establish the plurality of radio bearers associated with the EPS bearer.

According to an embodiment of the present invention, the base station determines the number of radio bearers to be associated with the EPS bearer based on at least one of number of processing cores at the UE which can be utilized for parallel processing when one EPS bearer is mapped to the plurality of radio bearers, capability of each processing core, utilization factor of each processing core and QoS of the EPS bearer.

According to an embodiment of the present invention, at least one of a number of processing cores, capability of each processing core and utilization factor of each processing core is indicated by the UE in the UE capability list sent by the UE to the BS.

According to an embodiment of the present invention, at least one of the number of processing cores, capability of each processing core and utilization factor of each processing core is indicated by the UE in the connection setup message sent by the UE to the BS.

According to an embodiment of the present invention, the number of processing cores at the UE comprises of transmit processing cores in case of the uplink and receive processing cores in case of the downlink.

According to an embodiment of the present invention, the processing capability of the processing core comprises at least one of a maximum data rate which can be processed by the transmit processing cores, a maximum data rate which can be processed by the receive processing cores and a clock rate of each processing core.

According to an embodiment of the present invention, the number of radio bearers associated with the EPS bearer is signaled in the connection configuration message.

According to an embodiment of the present invention, the EPS bearer type associated with the EPS bearer of radio bearer is signaled in the connection configuration message.

According to an embodiment of the present invention, identity of the same EPS bearer is signaled in connection configuration message during the creation of each radio bearer of an EPS bearer associated with the plurality of radio bearers.

According to an embodiment of the present invention, creating an EPS bearer corresponding to a plurality of radio bearers comprises of determining a number of radio bearers required for the EPS bearer by the UE, sending the determined number of radio bearers for the EPS bearer that needs to be established to the BS and sending the connection configuration message to the UE by the BS in order to establish the plurality of radio bearers associated with the EPS bearer.

According to an embodiment of the present invention, the UE determines the number of radio bearers to be associated with the EPS bearer that needs to be established based on at least one of number of processing cores at the UE which can be utilized for parallel processing when one EPS bearer is mapped to the plurality of radio bearers, capability of each processing core, utilization factor of each processing core and QoS of the EPS bearer.

Embodiments herein further provide a system for parallelizing packet processing in wireless communication. The system comprising a means adapted for creating, between an User Equipment (UE) and a base station (BS) a plurality of radio bearers, wherein the plurality of radio bearers carry data packets of an Evolved Packet System (EPS) bearer, a transmitter unit, adapted for processing the data packets of the EPS bearer associated with the plurality of radio bearers by a transmitter, wherein a first set of processing functions are applied to the data packets of the EPS bearer, distributing the processed data packets of the EPS bearer to the associated plurality of radio bearers, processing the distributed data packets of the EPS bearer in parallel, wherein a second set of processing functions are applied to the data packets of each radio bearer of the EPS bearer independently and transmitting the processed data packets of each radio bearer of the EPS bearer over a physical channel between the UE and the BS. The system further comprises a receiver unit adapted for receiving the data packets transmitted from the transmitter over the physical channel and processing the received data packets of the EPS bearer associated with the plurality of radio bearers.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

BRIEF DESCRIPTION OF DRAWINGS

The other objects, features and advantages will occur to those skilled in the art from the following description of the preferred embodiment and the accompanying drawings in which:

FIG. 1 is a block diagram of architecture of EPS bearer mapping to radio bearer, S1 bearer and S5/S8 bearer, according to a prior art illustration.

FIG. 2 is a system level architecture diagram illustrating mapping of an EPS bearer to multiple radio bearers, according to an embodiment of the present invention.

FIG. 3a is a perspective diagram illustrating a system for processing each radio bearer when an EPS bearer is mapped to multiple radio bearers, according to an embodiment of the present invention.

FIG. 3b is a perspective diagram illustrating a system for processing each radio bearer when an EPS bearer is mapped to multiple radio bearers, according to another embodiment of the present invention.

FIG. 4a-4h illustrates flow charts describing a method of processing an EPS bearer packet associated with multiple radio bearers in parallel, according to various embodiments of the present invention.

FIG. 5 is a schematic diagram illustrating distribution of data packets to one or more radio bearers based on a transmit buffer status, according to an embodiment of the present invention.

FIG. 6 is a block diagram illustrating the processing cores reserved for parallelization of EPS bearers, according to an embodiment of the present invention.

FIG. 7 is a flow diagram illustrating a signal flow between the UE and base station for providing UE capability indication in capability negotiation, according to an embodiment of the present invention.

FIG. 8 is a flow diagram illustrating a signal flow between the UE and base station showing a first EPS bearer set up after capability negotiation, according to an embodiment of the present invention.

FIG. 9 is a flow diagram illustrating a signal flow between the UE and base station showing a subsequent EPS bearer set up after capability negotiation, according to an embodiment of the present invention.

FIG. 10 is a flow diagram illustrating a signal flow between the UE and base station for providing EPS Bearer Setup when UE Processing Capability is sent in Connection Request, according to an embodiment of the present invention.

FIG. 11 is a table illustrating an UE processing capability indicator, according to an embodiment of the present invention.

FIG. 12 is a flow diagram illustrating a signaling process for establishing multiple radio bearers for a unidirectional (Downlink) EPS bearer, according to an embodiment of the present invention.

FIG. 13 is a flow diagram illustrating a signaling process for establishing multiple radio bearers for a unidirectional (Uplink) EPS bearer, according to an embodiment of the present invention.

FIG. 14 is a flow diagram illustrating a signaling process for establishing multiple radio bearers for a bidirectional EPS bearer, according to an embodiment of the present invention.

Although specific features of the present invention are shown in some drawings and not in others. This is done for convenience only as each feature may be combined with any or all of the other features in accordance with the present invention.

BEST MODE FOR CARRYING OUT THE INVENTION

The present invention provides a method and system for parallelizing packet processing in wireless communication. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

According to the embodiments of the present invention, multiple radio bearers are created between a User Equipment (UE) and the base station or eNB to carry the IP packets/data packets of an EPS bearer. An EPS bearer is mapped to multiple radio bearers. All the radio bearers associated with an EPS bearer has the same characteristics i.e. the PDCP entity, RLC entity configuration for each of these radio bearer is same. Even though multiple radio bearers are created between the UE and eNB for an EPS bearer, only one S1 bearer is created between the eNB and serving gateway and only one S5/S8 bearer is created between the serving gateway and the PDN gateway for the EPS bearer. The EPS bearer herein facilitates parallel processing of packets associated with EPS bearer.

FIG. 1 is a block diagram of architecture of EPS bearer mapping to radio bearer, S1 bearer and S5/S8 bearer, according to a prior art illustration. The user plane architecture in the current wireless communication technology (e.g. LTE) as illustrated in FIG. 1 comprises of a user equipment (UE), an enhanced node B (eNB) or base station, a serving gateway and packet data network (PDN) gateway. An Evolved Packet Service (EPS) bearer is established between the UE and PDN gateway for the transportation of application packets (or internet protocol (IP) packet). The EPS bearer is a bearer corresponding to an IP packet flow with a defined QoS between the UE and PDN gateway. Here the EPS bearer may be bidirectional or unidirectional. Multiple bearers can be established for an UE in order to provide different QoS streams or connectivity to different PDNs. For example, a user might be engaged in a voice (VoIP) call while at the same time performing web browsing or File Transfer Protocol (FTP) download. A VoIP bearer would provide the necessary QoS for the voice call, while a best-effort bearer would be suitable for the web browsing or FTP session. Similarly, the S5/S8 bearer transports the packet of an EPS bearer between the PDN gateway and serving gateway. The S1 bearer transports the packet of an EPS bearer between a serving gateway and eNB. The S-GW stores a one-to-one mapping between an S1 bearer and an S5/S8 bearer. The bearer is identified by the GTP tunnel ID across both interfaces. A radio bearer (RB) transports the packets of an EPS bearer between an UE and an eNodeB. There is one to one mapping between the EPS bearer, radio bearer, S1 bearer and S5/S8 bearers as shown in FIG. 1.

FIG. 2 is a system level architecture diagram illustrating mapping of an EPS bearer to multiple radio bearers, according to an embodiment of the present invention. A plurality of radio bearers (206a to 206n) is created between the UE 201 and eNB 202 to carry the data packets/IP packets of an EPS bearer 205. Here, the EPS bearer 205 is mapped to multiple radio bearers (206a-206n).

According to an embodiment herein, one data packet/IP packet flow is mapped to an EPS bearer 205 wherein the EPS bearer 205 is associated with multiple radio bearer's 206a-206n. In another embodiment, multiple data packet/IP packet flows are mapped to an EPS bearer 205 wherein the EPS bearer 205 is associated with multiple radio bearers 206a ? 206n, as shown in the FIG. 2. The plurality of radio bearers 206a-206n associated with an EPS bearer 205 have the same characteristics i.e. the PDCP entity and RLC entity configuration for each of these radio bearer and the processing functions applied to the data packets of these radio bearers is same. Even though multiple radio bearers are created between the UE 201 and eNB 202 for an EPS bearer 205, only one S1 bearer 207 is created between the eNB 202 and serving gateway 203 and only one S5/S8 208 bearer is created between the serving gateway 203 and the PDN gateway 204 for the EPS bearer 205.

The UE 201 transmits the data packets/IP packets of an EPS bearer 205 using multiple radio bearers 206a to 206n in the uplink for an EPS bearer associated with multiple radio bearers. The eNB 202 receives the data packets/IP packets of an EPS bearer 205 using multiple radio bearers 206a to 206n in the uplink for an EPS bearer associated with multiple radio bearers. The eNB 202 transmits the data packets/IP packets of an EPS bearer 205 using multiple radio bearers in the downlink for an EPS bearer associated with multiple radio bearers. The UE 201 receives the data packets/IP packets of an EPS bearer 205 using multiple radio bearers 206a to 206n in the downlink for an EPS bearer associated with multiple radio bearers. The UE 201 and eNB 202 transmits/receives the packets of multiple radio bearers associated with an EPS bearer 205 using the physical carrier 209 between the UE 201 and the eNB 202.

FIG. 3a-3b is a perspective diagram illustrating a system for processing each radio bearer when an EPS bearer is mapped to multiple radio bearers, according to an embodiment of the present invention. The EPS bearer 205 herein facilitates parallel processing of data packets associated with the EPS bearer 205. The packets of EPS bearer mapped to different radio bearers can be processed in parallel. Each radio bearer can be processed on a separate processing core as illustrated in FIGS. 3a and 3b.

Multiple EPS bearers each associated with multiple radio bearers can coexist. As shown in FIG. 3b, two EPS bearers associated with multiple radio bearers co-exist wherein EPS bearer 1 is associated with three radio bearers and EPS bearer 2 is associated with two radio bearers. Each of the radio bearer processing is performed on different processing core.

FIG. 4a is a flow diagram illustrating a method of processing data packets associated with an EPS bearer in a transmitter, according to an embodiment of the present invention. At the transmitter i.e. UE in case of uplink and eNB in case of downlink, it is determined whether the data packets received belongs to an EPS bearer associated with one radio bearer or an EPS bearer associated with multiple radio bearers (404). The data packets are received by eNB from serving gateway in case of downlink and data packets are received from application layer or IP layer in case of uplink (402). The transmitter determines this by first determining the EPS bearer of the received IP packet using the known methods and then using the stored radio bearer configuration for the determined EPS bearer. The transmitter may also determine this by using the EPS bearer type if the EPS bearer type is used in signaling at the time of EPS bearer creation.

If the data packets belong to an EPS bearer associated with multiple radio bearers, then the data packets of the EPS bearer are processed using a first set of processing functions. The first set of processing functions comprises of a function of sequence numbering of data packets across the radio bearers (406). The data packets are assigned sequence numbers before distributing them across radio bearers. This function is only applied for the EPS bearer which require in order delivery at the receiver. For example in case of uplink, the sequence numbering is needed if eNB has to deliver the data packets to serving gateway in order. The processed data packets using the first set of processing functions are then distributed across the radio bearers associated with the EPS bearer (408).

At 410, processing of the packets across radio bearers of an EPS bearer is performed. The processing functions defined for radio bearers are applied to packets of each radio bearer of the EPS bearer independently. Each radio bearer processing is done in parallel to radio bearer processing of other radio bearers of the EPS bearer. The processing of data packets of each radio bearer associated with the EPS bearer is performed in parallel using a second set of processing functions. The processing of the distributed data packets of the EPS bearer in parallel using a second set of processing functions comprises of applying sequence numbering, header compression, security, ARQ and PDU generation functions to the data packets. The PDU generation comprises of fragmentation and packing functions. It is to be noted that header compression, security and ARQ are applied if enabled for the radio bearers during the radio bearer establishment. The transmitter then transmits the processed data packets of each radio bearer of the EPS bearer to the receiver over the physical channel between the UE and the BS.

FIG. 4b is a flow diagram illustrating a method of processing data packets associated with an EPS bearer in a receiver, according to an embodiment of the present invention. At the receiver (i.e. UE in case of downlink and eNB in case of uplink) physical layer receives the packets from (eNB in case of downlink and UE in case of uplink) on the physical carrier. The physical layer processes the received packets and sends the MAC PDUs received to the MAC layer.

The MAC layer entity de-muxes the RLC PDUs and passes them to appropriate RLC entity. The RLC entity applies header parsing, unpacking, reassembly functions and ARQ functions (sequence number checking, ARQ window processing) to generate the PDCP PDUs and passes them to appropriate PDCP entity. The RLC entity of a radio bearer may not perform the reordering functions if the EPS bearer associated with radio bearer of RLC entity is also associated with other radio bearers and reordering is enabled for the EPS bearer.

The PDCP entity then applies the security and header decompression functions and sends the generated packets to reordering entity if the EPS bearer associated with radio bearer of PDCP entity is also associated with other radio bearers and reordering is enabled for the EPS bearer. The reordering entity reorders the packets across the radio bearers of the EPS bearer and sends the packets to IP layer in case the receiver is an UE or serving gateway in case the receiver is an eNB.

According to another embodiment herein, the PDCP entity applies the security and header decompression functions and sends the generated packets to IP layer in case the receiver is an UE or serving gateway in case the receiver is an eNB if the EPS bearer associated with radio bearer of PDCP entity is associated with only one radio bearer or if EPS bearer associated with radio bearer of PDCP entity is associated with multiple radio bearers and reordering is not enabled for the EPS bearer.

FIG. 4c is a flow diagram illustrating a method of processing data packets associated with an EPS bearer in a transmitter, according to another embodiment of the present invention. The data packets are received by eNB from serving gateway in case of downlink and packets are received from application layer or IP layer in case of uplink At the transmitter i.e. UE in case of uplink and eNB in case of downlink, it is determined whether the data packets received belongs to an EPS bearer associated with one radio bearer or an EPS bearer associated with multiple radio bearers.

If the data packets belong to an EPS bearer associated with multiple radio bearers, then the data packets of the EPS bearer are processed by the transmitter using a first set of processing functions. The first set of processing functions comprises of a function of sequence numbering of data packets across the radio bearers. The data packets are assigned sequence numbers before distributing them across radio bearers. Sequence numbering is only applied for the EPS bearer which require in order delivery at the receiver. For example in case of uplink, the sequence numbering is needed if eNB has to deliver the data packets to serving gateway in order. The first set of processing functions also comprises of header compression, and applying security function to packets across the radio bearers. The processed data packets using the first set of processing functions are then distributed across the radio bearers associated with the EPS bearer. Further, the transmitter processes the data packets of each radio bearer associated with the EPS bearer in parallel using second set of processing functions. The second set of processing functions herein comprises of applying ARQ functions and PDU generation functions to the data packets. The ARQ functions comprise of ARQ block generation and ARQ window processing and the PDU generation functions comprises packet fragmentation and packing. The transmitter then transmits the processed data packets of each radio bearer of the EPS bearer to the receiver over the physical channel between the UE and the BS. In case of an EPS bearer associated with multiple radio bearers, a single PDCP entity may be maintained across the radio bearers of this EPS bearer whereas the RLC entity is maintained per radio bearer. The first set of processing functions is performed by PDCP entity. The second set of processing functions is performed by RLC entity.

FIG. 4d is a flow diagram illustrating a method of processing data packets associated with an EPS bearer in a receiver, according to another embodiment of the present invention. The receiver herein process the data packets of each radio bearer associated with the EPS bearer in parallel using a first set of processing functions and further using a second set of processing functions. The first set of processing functions comprises of applying PDU processing and ARQ functions to the data packets. The second set of processing function comprises of applying security, sequence number checking, header decompression and reordering function to the data packets of the EPS bearer.

If the EPS bearer is associated with multiple radio bearers, then a single PDCP entity may be maintained across the radio bearers of the EPS bearer whereas the RLC entity is maintained per radio bearer. The first set of processing functions is performed by RLC entity. The second set of processing functions is performed by PDCP entity.

FIG. 4e is a flow diagram illustrating a method of processing data packets associated with an EPS bearer in a transmitter, according to yet another embodiment of the present invention. The data packets are received by eNB from serving gateway in case of downlink and packets are received from application layer or IP layer in case of uplink At the transmitter i.e. UE in case of uplink and eNB in case of downlink, it is determined whether the data packets received belongs to an EPS bearer associated with one radio bearer or an EPS bearer associated with multiple radio bearers.

If the data packets belong to an EPS bearer associated with multiple radio bearers, then the data packets of the EPS bearer are processed by the transmitter using a first set of processing functions. The first set of processing functions comprises of a function of sequence numbering of data packets across the radio bearers. The data packets are assigned sequence numbers before distributing them across radio bearers. Sequence numbering is only applied for the EPS bearer which require in order delivery at the receiver. For example in case of uplink, the sequence numbering is needed if eNB has to deliver the data packets to serving gateway in order. The processed data packets using the first set of processing functions are then distributed across the radio bearers associated with the EPS bearer. Further, the transmitter processes the data packets of each radio bearer associated with the EPS bearer in parallel using second set of processing functions. The second set of processing functions herein comprises of applying header compression, security, ARQ functions and PDU generation functions to the data packets. The ARQ functions comprise of ARQ block generation and ARQ window processing and the PDU generation functions comprises packet fragmentation and packing. Transmitter then transmits the processed data packets of each radio bearer of the EPS bearer to the receiver over the physical channel between the UE and the BS. In case of an EPS bearer associated with multiple radio bearers, a single PDCP entity may be maintained across the radio bearers of this EPS bearer whereas the RLC entity is maintained per radio bearer. The first set of processing functions is performed by PDCP entity. The second set of processing functions is performed by RLC entity.

In case of EPS bearer associated with multiple radio bearers, the PDCP entity (without security function and header compression) is maintained per radio bearers whereas the security function and header compression is maintained across radio bearers of the EPS bearer.

FIG. 4f is a flow diagram illustrating a method of processing data packets associated with an EPS bearer in a receiver, according to yet another embodiment of the present invention. The processing of the distributed data packets to the radio bearer of the EPS bearer in parallel by the receiver comprises of using processing functions such as PDU processing which includes header parsing, packet unpacking and re-assembly, ARQ generation functions such as SN check and ARQ window processing, applying security, header decompression functions to the data packets of each radio bearer of an EPS bearer associated with plurality of radio bearers. The processing of the distributed data packets further comprises of sequence number checking and reordering of the data packets.

If the EPS bearer herein is associated with multiple radio bearers, the PDCP entity (without security function and header compression) is maintained per radio bearers whereas the security function and header compression is maintained across radio bearers of the EPS bearer.

FIG. 4g is a flow diagram illustrating a method of processing data packets associated with an EPS bearer in a transmitter, according to yet another embodiment of the present invention. The data packets are received by eNB from serving gateway in case of downlink and packets are received from application layer or IP layer in case of uplink At the transmitter i.e. UE in case of uplink and eNB in case of downlink, it is determined whether the data packets received belongs to an EPS bearer associated with one radio bearer or an EPS bearer associated with multiple radio bearers.

If the data packets belong to an EPS bearer associated with multiple radio bearers, then the data packets of the EPS bearer are processed by the transmitter using a first set of processing functions. The first set of processing functions comprises of a function of sequence numbering of data packets across the radio bearers. The data packets are assigned sequence numbers before distributing them across radio bearers. Sequence numbering is only applied for the EPS bearer which require in order delivery at the receiver. For example in case of uplink, the sequence numbering is needed if eNB has to deliver the data packets to serving gateway in order. The first set of processing functions also comprises of header compression. The processed data packets using the first set of processing functions are then distributed across the radio bearers associated with the EPS bearer. Further, the transmitter processes the data packets of each radio bearer associated with the EPS bearer in parallel using second set of processing functions. The second set of processing functions herein comprises of applying security, ARQ functions and PDU generation functions to the data packets. The ARQ functions comprise of ARQ block generation and ARQ window processing and the PDU generation functions comprises packet fragmentation and packing. Transmitter then transmits the processed data packets of each radio bearer of the EPS bearer to the receiver over the physical channel between the UE and the BS.

In case of EPS bearer associated with multiple radio bearers PDCP entity (without header compression function and sequence numbering) is maintained per radio bearers whereas the compression function is maintained across radio bearers of the EPS bearer.

FIG. 4h is a flow diagram illustrating a method of processing data packets associated with an EPS bearer in a receiver, according to yet another embodiment of the present invention. The processing of the data packets of the EPS bearer associated with plurality of radio bearers by the receiver comprises of using processing functions such as applying security, ARQ and PDU generation functions to the data packets of each radio bearer of an EPS bearer associated with plurality of radio bearers.

The processing of the data packets of the EPS bearer in parallel further comprises of applying a second set of processing functions comprising decompressing the header of the data packets of the EPS bearer and sequence number checking for duplicate detection and re-ordering if the data packets need to be re-ordered.

In case of EPS bearer associated with multiple radio bearers PDCP entity (without header decompression function and sequence number checking) is maintained per radio bearers whereas the decompression function is maintained across radio bearers of the EPS bearer.

FIG. 5 is a schematic diagram illustrating distribution of data packets to one or more radio bearers based on a transmit buffer status, according to an embodiment of the present invention. The data packets are distributed among the associated radio bearers by the transmitter based on the transmit buffer status of each radio bearer as shown in FIG. 5. This will take care of situation wherein packets of one radio bearer may have been lost due to blocking of radio bearer buffer because of retransmissions. Here, the data packets are distributed in order of priority. The radio bearer which has less packets to be transmitted in the transmit buffer is given higher priority. In one embodiment, the transmit buffers of all radio bearers is maintained to be same if enough data packets are available. The radio bearer whose transmit buffer is least full is first filled with data packets up to the desired level and then the radio bearer whose transmit buffer is second least full is filled with data packets up to the desired level and so on.

According to another embodiment herein, the data packets are equally distributed amongst the associated radio bearers by the transmitter according to an embodiment herein. For example, a radio bearer 'n' is given packets which satisfy the condition 'Packet SN' mod 'N'=n where 'N' is the total number of radio bearers. Here the method of equal distribution of data packets may be known or unknown to the receiver.

According to another embodiment of the present invention, the data packets are distributed based on the processing capability of the processing core on which the radio bearers are processed. For example, if an EPS bearer is associated with two radio bearers RB1 and RB2, and RB1 is processed on Core 1 and RB2 is processed on Core 2. The processing capability of Core 1 is double that of Core 2. So in this case, RB1 will get double IP packets as compared to RB2.

FIG. 6 is a block diagram illustrating a plurality of processing cores reserved for parallelization of EPS bearers, according to an embodiment of the present invention. During the EPS bearer creation, the number of radio bearers is decided based on at least one of a maximum number of processing cores supported at the UE which can be utilized for parallel processing when one EPS bearer is mapped to multiple RBs, the capability of each processing core/chain, data rate of the EPS bearer and the number of already existing radio bearers and processing cores/chains used by the already established EPS bearer.

According to an embodiment herein only a subset of the maximum available processing cores are reserved by the UE to be used for parallelization of processing a single EPS bearer. The multiple EPS bearers which do not require parallelization can be processed on a single processing core.

According to the embodiments herein, "processing chains" implies at least a "processing core". In one embodiment, layer 2 processing for each radio bearer is performed on a separate processing core and the layer 1 processing is performed on a single baseband processing chain. In another embodiment, each radio bearer has a dedicated processing core for layer 2 processing and a dedicated baseband processing core for layer 1 processing. In another embodiment layer 2 processing for each radio bearer is performed on a separate processing core and the layer 1 processing is performed on more than one baseband processing core but there is no one to one mapping between the layer 2 processing cores and layer 1 processing chains.

FIG. 7 is a flow diagram illustrating a signal flow between the UE and base station for providing UE capability indication in capability negotiation, according to an embodiment of the present invention. After the power on, the UE 201 shares with the eNB 202, the number of cores that can be utilized for parallel processing of the radio bearers when an EPS bearer is mapped to a plurality of radio bearers along with the processing capability of each core. The UE 201 exchanges the information on the UE's capability of processing cores with the eNB 202 during capability negotiation.

FIG. 8 is a flow diagram illustrating a signal flow between the UE and base station showing a first EPS bearer set up after capability negotiation, according to an embodiment of the present invention. For the setup of the first EPS bearer after power ON, when the UE's capability of processing cores is already exchanged during the capability negotiation on power ON, the UE 201 sends a QoS for the connection to be setup in a RRC Connection Setup Request message to the eNB 202. The eNB 202 based on the UE's processing capability information received in the Capability Negotiation phase and the QoS of the requested EPS bearer, computes the number of the radio bears the requested EPS bearer should be mapped to. The eNB 202 then sends requested EPS bearer information along with the details and number of the radio bearers to the UE 201 in an RRC Connection Setup Response. The UE 201 on receiving the information from the eNB 202 sends an RRC Connection Setup Complete message to the eNB 202.

FIG. 9 is a flow diagram illustrating a signal flow between the UE and base station showing a subsequent EPS bearer set up after capability negotiation, according to an embodiment of the present invention. The UE 201 sends QoS for the connection to be setup in a RRC Connection Setup Request message to the eNB 202. The eNB based on the UE's processing capability information received in the Capability Negotiation phase, the QoS of the requested EPS bearer and the currently ongoing EPS bearers, decides the number of the radio bearers the requested EPS bearer needs to be mapped to for establishment of subsequent EPS bearers. The eNB 202 then sends this information to the UE 201 in the RRC Connection Setup Response. The UE 201 on receiving the information from the eNB 202 sends an RRC Connection Setup Complete message to the eNB 202.

FIG. 10 is a flow diagram illustrating a signal flow between the UE and base station for providing EPS Bearer Setup when UE Processing Capability is sent in Connection Request, according to an embodiment of the present invention. According to an embodiment of the present invention, UE 201 exchanges the information on capability of processing cores/chains during the time of connection setup instead of the capability negotiation phase. The UE 201 computes the available processing cores from the processing cores available for parallelization of EPS bearers by deducting the processing cores and the corresponding processing capability that are already being used for already established EPS bearers. The UE 201 then sends the information of the number of available processing cores and the processing capability of each processing core in the RRC Connection Setup Request. The eNB based on the value of the number of available processing cores and the processing capability of each processing core and the QoS of the requested EPS bearer decides the number of the RBs the requested EPS bearer needs to be mapped. The eNB 202 then sends this information to the UE 201 in the RRC Connection Setup Response. On receiving the information from the eNB 202, the UE 201 sends out an RRC Connection Setup Complete message to the eNB 202.

According to an embodiment of the present invention, the eNB can send the information on the number of radio bearers that the requested EPS bearer is mapped to in a single message such that the message includes the configuration for each radio bearer, the IDs of the radio bearers and the ID of the EPS bearer. It is to be noted that the configuration of each of the radio bearers that are mapped to the same EPS bearer can be same. The configuration includes the PDCP and RLC configurations. For example this can be illustrated as below:

---

Connection Setup Response {
...
PDCP Configuration,
RLC Configuration,
List of RB IDs (RB_ID1, RB_ID2)
EPS Bearer EPS_ID1
...
}

---

The UE based on the above message can identify that radio bearers RB_ID1 and RB_ID2 are associated with EPS bearer EPS_ID1.

According to another embodiment of the invention, the eNB can send the information on the number of radio bearers that the requested EPS bearer is mapped to in multiple messages such that each message includes the configuration for the radio bearer, the ID of the radio bearer and the ID of the EPS bearer. The UE on receiving multiple such messages can identify the radio bearers associated with an EPS bearer based on the radio bearer ID and the EPS bearer ID present in each message. For example, this can be illustrated as below:

---

Connection Setup Response1 {
...
PDCP Configuration,
RLC Configuration,
Radio Bearer RB_ID1,
EPS Bearer EPS_ID1
...
}
Connection Setup Response2 {
...
PDCP Configuration,
RLC Configuration,
Radio Bearer RB_ID2,
EPS Bearer EPS_ID1
...
}

---

The UE based on the messages Connection Setup Response and Connection Setup Response2 can identify that radio bearers RB_ID1 and RB_ID 2 are associated with EPS bearer EPS_ID1.

FIG. 11 is a table illustrating an UE processing capability indicator, according to an embodiment of the present invention. The processing capability of each processing core is informed to the eNB 202 using a Processing Capability Indicator for each processing core. The Processing Capability Indicator is a quantized indicator for the physical processing capability of a processing core. For example, the Processing Capability Indicator can represent the clock speed of a processing core/chain.

According to another embodiment herein, the number of available processing cores is indicated when the capabilities of all the processing cores are equal. When multiple processing cores have same processing capability, the processing capability can be indicated in a grouped manner.

In an alternate embodiment, the processing capability of an UE can be indicated through an UE class. For example, if a UE which has 'n' cores of 'x' processing capability each can be indicated by a UE Class Value 'A' while a UE which has 'm' cores of 'y' processing capability each can be indicated using a different UE Class Value 'B'. If a UE has 'n' cores of 'x' processing capability each and 'm' cores of 'y' processing capability each, then it can be indicated using a different UE Class Value 'C'.

FIG. 12 is a flow diagram illustrating a signaling process for establishing multiple radio bearers for a unidirectional (Downlink) EPS bearer, according to an embodiment of the present invention. The eNB 202 triggers a radio bearer establishment for the EPS bearer based on an EPS bearer establishment request from a mobile station or a core network. The eNB 202 then determines the number of radio bearers required for the EPS bearer to be mapped to. The eNB 202 then sends information on the number of radio bearers, PDCP configuration, RLC configuration, Logical Channel ID and EPS bearer ID over an RRC connection reconfiguration message to the UE 201. Based on the information received from the eNB, the UE 201 understands the number of radio bearers that are established for same EPS bearer as one set of PDCP/RLC configuration is received for the plurality of radio bearers. The UE 201 then sends an RRC Connection Reconfiguration Complete message to the eNB 202. Further the eNB 202 transmits the data packets of the EPS bearing using the determined number of radio bearers to the UE 201.

FIG. 13 is a flow diagram illustrating a signaling process for establishing multiple radio bearers for a unidirectional (Uplink) EPS bearer, according to an embodiment of the present invention. The eNB 202 triggers a radio bearer establishment for the EPS bearer based on an EPS bearer establishment request from a mobile station or a core network. The eNB 202 then determines the number of radio bearers required for the EPS bearer to be mapped to. The eNB 202 then sends information on the number of radio bearers, PDCP configuration, RLC configuration, Logical Channel ID and EPS bearer ID over an RRC connection reconfiguration message to the UE 201. Based on the information received from the eNB, the UE 201 understands the number of radio bearers that are established for same EPS bearer as one set of PDCP/RLC configuration is received for the plurality of radio bearers. The UE 201 then sends an RRC Connection Reconfiguration Complete message to the eNB 202. Further the eNB 202 receives the data packets of the EPS bearer transmitted by the UE 201 using the determined number of radio bearers.

FIG. 14 is a flow diagram illustrating a signaling process for establishing multiple radio bearers for a bidirectional EPS bearer, according to an embodiment of the present invention. The eNB 202 triggers a radio bearer establishment for the EPS bearer based on an EPS bearer establishment request from a mobile station or a core network. The eNB 202 then determines the number of radio bearers required for the EPS bearer to be mapped to. The eNB 202 then sends information on the number of radio bearers, PDCP configuration, RLC configuration, Logical Channel ID and EPS bearer ID over an RRC connection reconfiguration message to the UE 201. Based on the information received from the eNB, the UE 201 understands the number of radio bearers that are established for same EPS bearer as one set of PDCP/RLC configuration is received for the plurality of radio bearers. The UE 201 then sends an RRC Connection Reconfiguration Complete message to the eNB 202. In case of the bidirectional signaling, both the UE 201 and the eNB 202 transmits/receives the data packets of the EPS bearing using the plurality of radio bearers from/to each other.

According to an embodiment herein, when a new EPS bearer needs to be established, a resource control based admission control procedure needs to be performed wherein, the new EPS bearer request is accepted if sufficient amount of processing resources are available else the new EPS bearer request is rejected. In an alternate embodiment, if sufficient amount of processing resources are not available, then one or more existing lower priority EPS bearer are stopped/terminated and the new EPS bearer request is addressed. Alternatively, the termination of lower priority EPS bearer is based on user discretion.

In another embodiment of the invention, the UE determines the number of radio bearers that an EPS bearer needs to be mapped to, based on the number of available processing cores and the processing capability of each processing core and the QoS of the EPS bearer that needs to be established. The UE sends the determined number of radio bearers that the EPS bearer needs to be mapped to the eNB in the connection setup request message. The eNB may accept the recommendation of the UE. If the eNB wants to change the number of radio bearers, it can reduce the number of the radio bearers that requested EPS bearer needs to be mapped to and communicate the same to the UE.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, firmware, and/or software embodied in a machine readable medium. Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

The invention claimed is:

1. A method for parallelizing packet processing hy a user equipment (UE) in wireless communication, the method comprising:
    creating, between the UE and a base station (BS), a plurality of radio bearers, wherein the plurality of radio bearers are associated with an evolved packet system (EPS) bearer and carry first data packets of the EPS bearer;
    processing the first data packets by applying a first set of processing functions to the first data packets;
    distributing the processed first data packets to the plurality of radio bearers;
    processing the distributed first data packets in parallel by applying a second set of processing functions to the distributed first data packets independently; and
    transmitting the processed first data packets to the BS via a physical channel between the UE and the BS.

2. The method of claim 1, wherein the processing of the first data packets by applying the first set of the processing functions further comprises at least one of:
    sequence numbering the first data packets, wherein the sequence numbering is applied if the first data packets need to be reordered in the BS;
    compressing a header of the first data packets; or
    applying security to the first data packets.

3. The method of claim 1, wherein the processing of the distributed first data packets in parallel comprises:
    applying at least one of sequence numbering, header compression, security, automatic repeat request (ARQ) and packet data unit (PDU) generation functions to the first data packets.

4. The method of claim 1, wherein the plurality of radio bearers associated with the EPS bearer are configured to apply same processing functions to the first data packets.

5. The method of claim 1, wherein the plurality of radio bearers associated with the EPS bearer is configured with a same protocol sub layer parameter and configurations.

6. The method of claim 1, wherein the processing of the distributed first data packets is executed on distinct processing cores in parallel.

7. The method of claim 1, wherein the distributing of the processed first data packets to each of the plurality of radio bearers comprises at least one of:
    distributing the plurality of the first data packets equally among the associated radio bearers;
    distributing the first data packets based on a transmit buffer status associated with each of the associated radio bearers; or
    distributing the first data packets based on a processing capability of a processing core in which the plurality of radio bearers are processed.

8. The method of claim 1, comprising:
    receiving second packets via the physical channel from the BS;
    processing the received second data packets;
    processing the second data packets of each of the radio bearers associated with the EPS bearer in parallel, wherein the first set of processing functions are applied to the second data packets independently; and
    processing the second data packets,
    wherein the second set of processing functions is applied to the second data packets.

9. The method of claim 8, wherein the processing of the received second data packets using the second set of processing function comprises:
    applying at least one of PDU processing, ARQ functions, security, sequence number checking, header decompression and reordering function to the second data packets.

10. The method of claim 8, wherein the processing of the received second data packets using the second set of processing function comprises:
    applying sequence number checking and reordering function to the second data packets.

11. The method of claim 8, wherein the processing of the received second data packets using the second set of processing function comprises:

applying sequence number checking, reordering and header decompression function to the second data packets.

12. The method of claim 1, wherein the creating of the plurality of radio bearers between the UE and the BS comprises:
   determining a number of the radio bearers required for the EPS bearer; and
   sending one or more connection configuration messages to the BS to establish the plurality of the radio bearers associated with the EPS bearer.

13. The method of claim 12, further comprising:
   determining the number of radio bearers to be associated with the EPS bearer based on at least one of:
      a number of processing cores at the BS which can be utilized for parallel processing when one EPS bearer is mapped to the plurality of radio bearers;
      capability of each processing core;
      utilization factor of each processing core; or
      a quality of service (QoS) of the EPS bearer.

14. The method of claim 13, wherein at least one of the number of processing cores, capability of each of the processing cores, or utilization factor of each of the processing cores is indicated by the BS in the UE capability list sent by the BS to the UE.

15. The method of claim 14, wherein the at least one of the number of processing cores, capability of each of the processing cores or utilization factor of each of the processing cores is indicated by the BS in the connection setup message sent by the BS to the UE.

16. The method of claim 14, wherein the number of the processing cores at the UE comprises:
   transmit the processing cores in case of the uplink; and
   receive the processing cores in case of the downlink.

17. The method of claim 14, wherein the processing capability of the processing core comprises at least one of:
   a maximum data rate which can be processed by the transmitted processing cores;
   a maximum data rate which can be processed by the received processing cores; or
   a clock rate of each processing core.

18. The method of claim 12, wherein the number of radio bearers associated with the EPS bearer is signaled in a connection configuration message.

19. The method of claim 12, wherein an EPS bearer type associated with the EPS bearer of the radio bearers is signaled in a connection configuration message.

20. The method of claim 12, wherein a same EPS bearer identity is signaled in a connection configuration message during the creation of each of the radio bearers.

21. The method of claim 1, wherein the creating of the EPS bearer corresponding to the plurality of radio bearers comprises of:
   determining a number of the radio bearers required for the EPS bearer by the UE;
   sending the determined number of the radio bearers for the EPS bearer that needs to be established to the BS; and
   receiving a connection configuration message from the BS in order to establish the plurality of radio bearers associated with the EPS bearer.

22. The method of claim 21, wherein the determining of the number of radio bearers to be associated with the EPS bearer that needs to be established based on at least one of:
   the number of processing cores at the BS which can be utilized for parallel processing when one EPS bearer is mapped to the plurality of the radio bearers;
   capability of each of the processing cores;
   utilization factor of each of the processing cores; or
   a quality of service (QoS) of the EPS bearer.

23. A system for parallelizing packet processing in wireless communication, the system comprising:
   at least one processor configured to:
      create, between an user equipment (UE) and a base station (BS), a plurality of radio bearers, wherein the plurality of the radio bearers are associated with an evolved packet system (EPS) bearer and carry first data packets of the EPS bearer;
   a transmitter configured to:
      process the first data packets by applying a first set of processing functions to the first data packets,
      distribute the processed first data packets of the EPS bearer to the plurality of the radio bearers,
      process the distributed first data packets in parallel by applying a second set of processing functions to the distributed first data packets independently, and
      transmit the processed first data packets via a physical channel between the UE and the BS; and
   a receiver configured to:
      receive second data packets via the physical channel from the BS, and
      process the received second data packets.

* * * * *